United States Patent
Zegelin et al.

(12) 
(10) Patent No.: US 6,694,430 B1
(45) Date of Patent: Feb. 17, 2004

(54) DATA ENCRYPTION INTEGRATED CIRCUIT WITH ON-BOARD DUAL-USE MEMORY

(75) Inventors: Chris Zegelin, San Jose, CA (US); Sarosh Vesuna, Los Altos, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/264,130

(22) Filed: Mar. 5, 1999

(51) Int. Cl.[7] ................................................. G06F 11/30
(52) U.S. Cl. ........................ 713/160; 713/164; 713/168
(58) Field of Search ................................. 713/189, 191, 713/192, 193, 194, 160

(56) References Cited

U.S. PATENT DOCUMENTS

| | | | | |
|---|---|---|---|---|
| 4,352,952 A | * | 10/1982 | Boone et al. ................ | 713/192 |
| 5,325,430 A | * | 6/1994 | Smyth et al. ................ | 713/192 |
| 5,623,637 A | * | 4/1997 | Jones et al. ................ | 711/164 |
| 5,729,680 A | * | 3/1998 | Belanger et al. ............ | 709/222 |
| 6,167,513 A | * | 12/2000 | Inoue et al. ................ | 713/150 |

* cited by examiner

*Primary Examiner*—Thomas R. Peeso
(74) *Attorney, Agent, or Firm*—Carter, Deluca, Farrell & Schmidt, LLP

(57) ABSTRACT

An interface chip for a peripheral module connectable to and for use with a host computer is provided which utilizes an static Random access memory (SRAM) within the interface chip for both encryption of data packets and temporary storage of Card Information Structure (CIS) information. The CIS information is stored in the SRAM only during the power-up phase of operation, when encryption of data packets is not necessary and thus the memory is not being utilized for that purpose. This precludes the need for a separate SRAM IC, thus saving space on the card.

20 Claims, 3 Drawing Sheets

DATA ENCRYPTION INTEGRATED CIRCUIT WITH ON-BOARD DUAL-USE MEMORY

BACKGROUND OF THE INVENTION

1. Field of the Invention

The invention relates to data communications interface IC chips for personal computers. More specifically, the present invention relates to an IC chip that functions both as the interface circuit to a host computer and for encryption/decryption of datagrams to and from the host.

2. The Background Art

Data encryption systems fall into two general categories: systems based on public-key (or asymmetric) algorithms and systems using symmetric algorithms. Public-key algorithms use a public/private key pair with one key used for encryption and the other for decryption. In most symmetric algorithms, the encryption key and the decryption key are the same. Public-key and symmetric encryption systems are used to solve different types of data security problems. Symmetric-key encryption, for example, is generally faster and often used to encrypt large amounts of data while public-key encryption is more popular when key management is an issue.

Data encryption may be used to secure data before it is transmitted across an insecure communications link. An encryption device at one end of a communications link encrypts the data, and possibly routing and protocol information, before the data is transmitted across an insecure data link. In a symmetric key encryption system, users at the other end of the communication link must have a device that decrypts the data using the same encryption algorithm and a common key.

Data encryption devices may be in the form of software installed in a conventional processing system or specialized hardware such as, for example, encryption modules or chips, dedicated encryption boxes, or encryption boards that plug into personal computers. Specialized hardware is generally faster, more secure, and easier to install than software-based encryption. Encryption is a computation-intensive task which is generally more efficient when performed by a specially-designed chip. Additionally, encryption algorithms implemented in hardware may be securely encapsulated to be tamperproof. Furthermore, it is easier and often more cost-effective to design secure telephones, fax machines, and communications equipment with special purpose encryption hardware than with an added microprocessor and encryption software.

There exist a number of publicly available cryptographic algorithms suitable for use with special-purpose encryption hardware for data encryption. The Data Encryption Standard (DES), for example, is a symmetric block cipher that encrypts data in 64-bit blocks using the same 56-bit key that is used for decryption. Triple-DES, or 3DES, is simply encryption with DES and three different keys, thus making an effective key length of 168 bits. These algorithms are described in Schneier, Bruce, Applied Cryptography (2nd ed. 1996), pp. 265–85, 294–301.

International Data Encryption Algorithm (IDEA) is another symmetric block-cipher that also encrypts in 64-bit blocks, but it uses a 128-bit key. RC4 and RC5 are variable-key-size stream ciphers licensed by RSA Data Security Inc. Both RC4 and RC5 are symmetric block algorithm designed to serve as an alternative to DES and are reportedly immune to linear differential cryptanalysis and other mathematical methods of attacking encryption systems, which would make them more secure than DES. These and other suitable algorithms are described in Schneier, Bruce, Applied Cryptography (2nd ed. 1996), pp. 303–355.

Many of these encryption algorithms and others have been implemented as an application specific integrated circuit (ASIC) or "chip." The MYK-78 Clipper Chip, for example, is a tamper-resistant chip manufactured by VLSI Technologies that is designed for encrypting voice communications. The Clipper Chip implements the SKIPJACK cryptographic algorithm using 1 micron CMOS technology. VLSI and RSA are reportedly creating other silicon chip-based implementations of RSA's encryption technologies, including the RC4 symmetric stream cipher, for use in high-volume, high-speed consumer applications such as home satellite services and TV set-top boxes.

Encryption chips may be combined with PC cards to create portable encryption modules for use in adding encryption capabilities to other "host" devices. A PC card is a small 68-pin removable card conforming to physical and electrical interface standards set forth in the PC Card Standard of the Personal Computer Memory Card International Association (PCMCIA) of Sunnyvale, Calif. PC cards may contain hardware and software customized to perform a specific application and may be used to expand the capabilities of a host device, such as a mobile or notebook computer. To use the functions of the PC card, the PC card is inserted into a slot on a host device. The host device powers the card, recognizes the capabilities of the card, and initializes certain interface processes accordingly.

To reduce compatibility problems between PC cards and host systems, many conventional PC cards use a standardized interface system such as a Card Information Structure (CIS) set forth by the PC Card Standard. Using CIS, a data structure is stored in a PC card's memory that identifies the physical attributes and logical configuration of the card. The physical attributes include such things as the card's type, manufacturer, and part number. The logical configuration includes such things as the card's file system and number of logical partitions.

Conventional PC cards containing an encryption algorithm may be utilized in a wireless communications network, for example, to increase the secrecy of the communications transmitted between source and destination. An example of a PC card containing an encryption algorithm this is a PC radio card, or PC radio peripheral module, which provides communication between a mobile host computer and stationary base stations or access points over a wireless LAN.

FIG. 1 is a block diagram illustrating an example of a wireless radio card known in the prior art. Such a card may be used to connect a mobile or notebook computer to a wireless data network, such as an RF LAN. Card 10 may be placed in an interface slot 12 in a computer. The interface slot acts communicatively couples the computer and the card, allowing for the free exchange of data, as well as power derived from a power source 14. Card 10 includes an interface chip 16, which is generally an Application Specific Integrated Circuit (ASIC). The interface chip 16 generally contains a power control circuit 18, which controls the distribution of power to the card. There may be power conservation circuitry included which shuts off power to the rest of the card if the radio is not in use in order to reduce the amount of overall power utilization of the card.

The interface chip 16 also includes encryption circuitry 20 to perform the encryption and decryption processes. The preferred embodiment utilizes the RSA RC4 variable-key-size stream cipher, but any appropriate encryption algorithm can be used as well. The encryption process utilizes memory, generally in the form of a dedicated static random access memory (SRAM) 22, located within the interface chip 16 to store the data while it is being encrypted. Encipherment may begin with a secret key that has been distributed to cooperating stations by an external key management service. The secret key is concatenated with an initialization vector (IV) and the resulting seed is input to a pseudo random number generator (PRNG). The PRNG outputs a key sequence k of pseudo-random bits equal in length to the largest possible Message Protocol Data Unit (MPDU), the unit of the file format utilized by wireless LANs. Two processes are applied to the plaintext MPDU. To protect against unauthorized data alterations, an integrity algorithm operates on the plaintext to produce an integrity check value (ICV). Then, encryption is performed.

Encryption takes place by first initializing a 256-byte S-box ($S_0$ . . . $S_{255}$) linearly (i.e. $S_0=0$, $S_1=1$, etc.). Then another 256-byte array ($K_0$ . . . $K_{255}$) is filled with the variable length key, repeating the key as necessary to fill the array. The memory is further initialized by performing the following function:

for i=0 to 255:
$j=(j+S_i+K_1) \mod 256$
swap $S_i$ and $S_j$

To encrypt the data, the byte K is XORed with the data. K is determined using the following function with two counters i and j, initialized to zero:

$i=(i+1) \mod 256$
$j=(j+S_i) \mod 256$
swap $S_i$ and $S_j$
$t=(S_i+S_j) \mod 256$
$K=S_t$ The output is then a message the resulting ciphertext, the IV, and the ICV. The PRNG simplifies the task of key distribution by transforming a relative short secret key into an arbitrarily long key sequence, requiring only the secret key to be communicated between stations. The secret key remains constant while the IV periodically changes. The IV may be changed as frequently as every MPDU and, since it is contained in the message, the receiver will always be able to decipher any message.

Decipherment is accomplished using the inverse process of encipherment. Both encipherment and decipherment are performed in SRAM 22.

CPU 24 is used by the card to control the processes performed by the card. When the card 10 is first placed in a computer and the computer is powered up, a signal from the computer is normally sent to the card inquiring as to the type of card or other CIS information. The CIS is generally stored in an Electrically Erasable Programmable Read Only Memory (EEPROM) 26. This allows the information to be periodically changed if the need arises (using a patch), while allowing the information to be maintained when there is no power running through the card (i.e. when the computer is off or the card is unplugged). When the module is powered up, the CIS is automatically transferred out of the EEPROM 26 through CIS circuitry 28 to an SRAM 30 located outside the interface chip 16 for temporary storage. At the appropriate point in the timing cycle of the handshake protocol, the CIS is transferred to the host computer. Storage in an SRAM is necessary because the EEPROM 26 is too slow to access during the handshake protocol and is also not easily addressable. After the CIS is transferred out of the SRAM 30 to the computer under control of the interface chip, the SRAM 30 can then be utilized for other storage purposes by the CPU 24.

The output of the interface chip 16 is encrypted data or datagrams which need to be converted to packets or frames in accordance with a wireless transmission standard for broadcast over the wireless LAN. Therefore, the card may also contain a Media Access Control (MAC) layer chip 32, which performs the conversion to the appropriate packet or frame structure. A Flash RAM 38, is provided that may contain software for this conversion. A radio circuit 34 then produces a modulated radio signal which is broadcast from the transmitter/receiver 36 at predetermined intervals in order across the wireless media.

OBJECT OF THE INVENTION

It is a general object of the present invention to provide a single integrated circuit for communications interfacing and encryption.

It is another object of the invention to provide a single integrated circuit which performs initialization of a communications channel and encryption/decryption of data through such channel.

It is a further object of the present invention to provide dual use of high speed RAM on a single IC chip used for data encryption.

A further object of the invention is to provide an interface ASIC chip for use in a peripheral card or module which eliminates the need to have a separate SRAM chip on the module, thus reducing interconnections, module size and component count.

SUMMARY OF THE INVENTION

Devices and methods consistent with the present invention provide a peripheral module for use with a host computer. The module includes an integrated circuit chip including a dual function on-board memory. Module identification characteristics are stored in the memory on the integrated circuit chip and transmitted to the host computer during initialization of the peripheral module. Following initialization, the host transmits and receives data from the peripheral module which encrypts (or decrypts) the data using the same on-board memory of the integrated circuit chip.

In accordance with one embodiment of the invention, as embodied and broadly described herein, a peripheral module comprises an integrated circuit chip for performing interfacing to a host computer, and encryption/decryption of data to and form the host computer. The integrated circuit chip includes a memory for storing encryption information and module identification information. The integrated circuit chip further includes logic for directing the chip to access module identification information from an external EEPROM, store it in the on-board memory, and transfer it to the host computer.

More specifically, the present invention provides an interface chip for use in a peripheral module connectable to and for use with a host computer. The chip utilizes a single static random access (SRAM) on the interface chip for both encryption of data packets and temporary storage of Card Information Structure (CIS) information during initialization. The CIS information is stored in the SRAM only during the power-up or initialization phase of operation, when encryption of data packets is not necessary and thus the memory is not being utilized by the encryption algorithm.

This precludes the need for any additional SRAM IC outside the interface chip, thus making a more compact module possible.

Additional objects, advantages and novel features of the present invention will become apparent to those skilled in the art from this disclosure, including the following detailed description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and its equivalents and with respect to which the invention could be of significant utility. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification illustrate an embodiment of the invention and together with the description, serve to explain the principles of the invention.

DETAILED DESCRIPTION OF THE INVENTION

Figure 2:
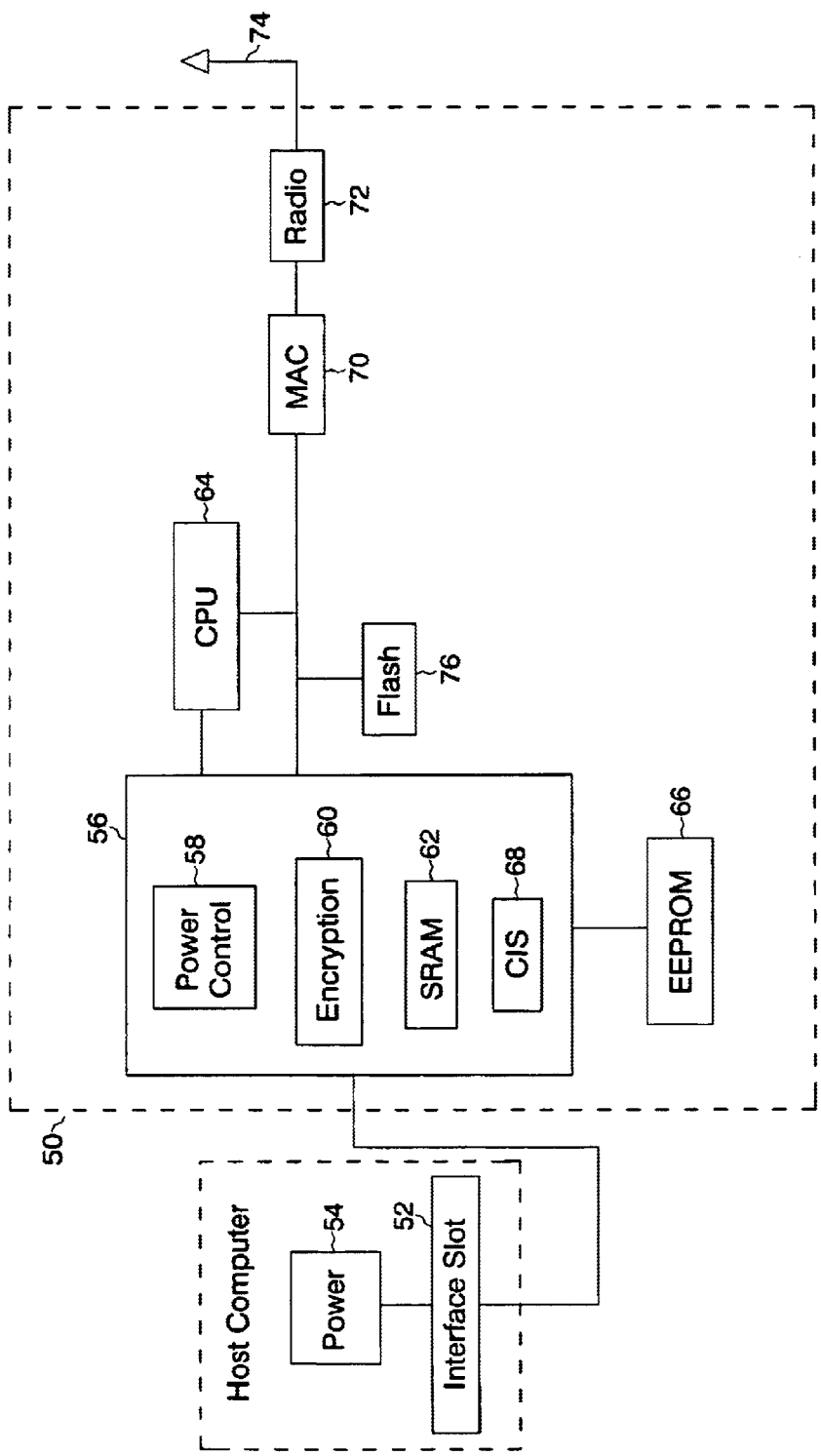
FIG. 2 is a block diagram illustrating wireless radio module in accordance with a presently preferred embodiment of the invention.

A data communications interface chip is provided which eliminates the need for SRAM IC in a PC card. FIG. 2 is a block diagram illustrating a PC card in accordance with a presently preferred embodiment of the invention. Card 50 is connected to an PCMCIA interface slot in a host computer. The host computer contains a power source such as a battery 54 which provides power to the host computer. Power source 54 may also provide power to a card connected to the interface slot 52 via the interface slot. Card 50 may contain an interface chip 56, which would generally be an ASIC. The interface chip 56 may contain a power control circuit 58, which controls the distribution of power to the card and may contain power conservation circuitry to shut off power to portions of the card that are not in use.

Figure 1:
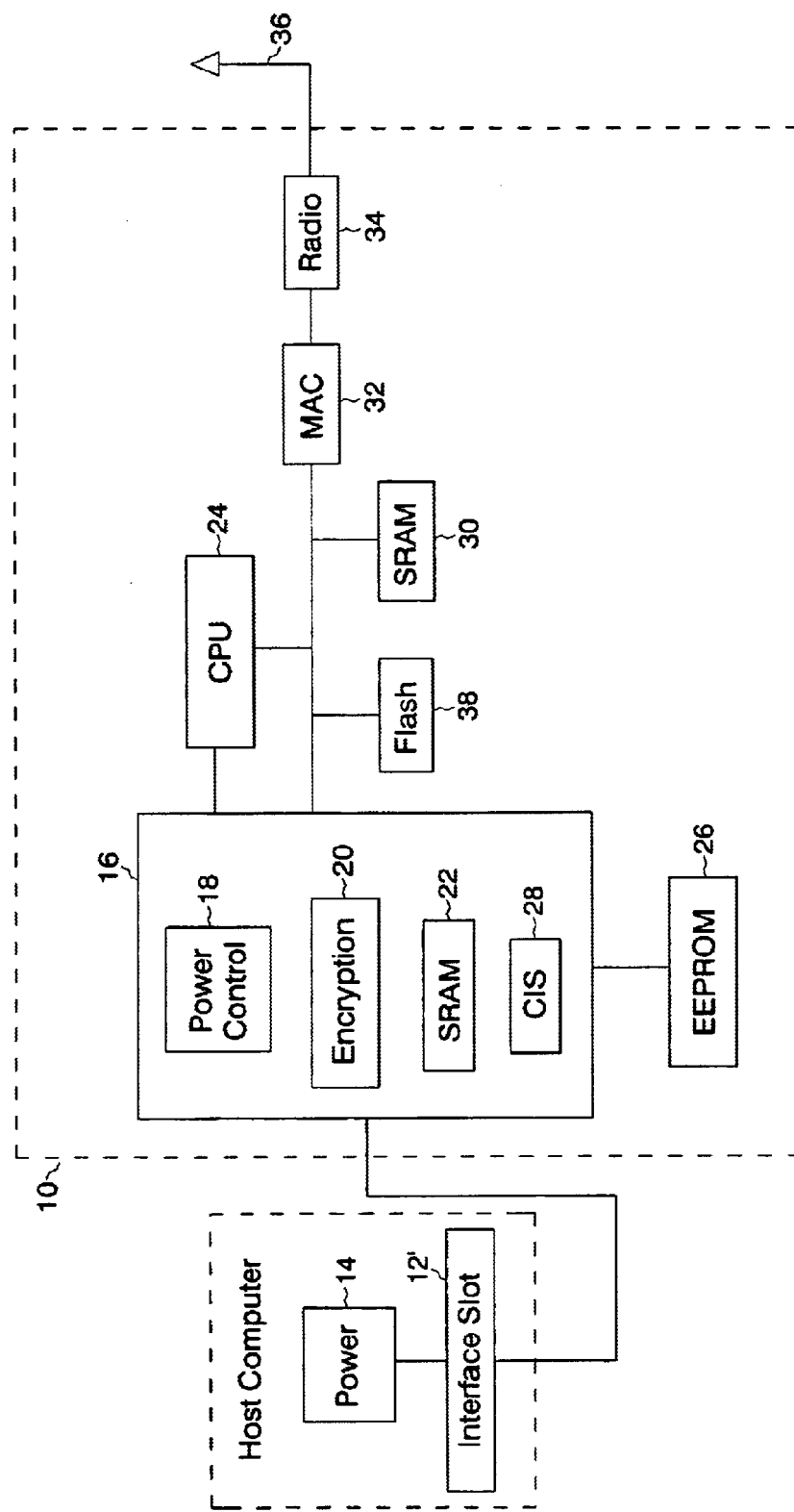
FIG. 1 is a block diagram showing a prior art wireless radio module.

In the preferred embodiment, the interface chip 56 will also contain encryption circuitry 60 similar to that described in connection with FIG. 1. The circuitry acts to encrypt and decrypt packets using an encryption process or algorithm along with a key. SRAM 62 may be used during the encryption or decryption process along with central processing unit (CPU) 64. There may be a multiplexor or switch (either in hardware or software) in the control path of the SRAM 62 which is set by a flag or selection criteria depending on whether the card 50 is in the initialization process or not.

When the card 50 is first placed in a new computer and the computer is powered up, the initialization process begins, the selection criteria allows the CIS or similar data structure containing information regarding the type of the card 50 to be transferred from EEPROM 66 through CIS circuitry 68 to SRAM 62. Use of a high speed memory or SRAM is needed because the EEPROM 66 is generally slow to access and is not easily addressable, so a faster and easily addressable memory must be used, such as the SRAM 62. After the initialization is completed, and the CIS data received by the host, the flag or selection criteria defaults to normal and SRAM 62 performs data storage for the encryption and decryption process as the card 50 is used to transmit and receive data from the host.

By utilizing the SRAM 62 on the interface chip 56 for the temporary storage of the CIS or similar data structure, this eliminates the need for a separate IC containing additional memory for the CIS procedure, and thus frees up space on the card and makes a more compact card possible. In the preferred embodiment of the invention, SRAM 62 is 256K bytes.

The output of the interface chip 56 is encrypted data which needs to be converted to a packet or frame structure according to a wireless transmission standard for broadcast over the wireless LAN. Therefore, the card 50 may also contain a Media Access Control (MAC) layer chip 70, which aids in the conversion to the wireless transmission standard as well as a Flash RAM 76, which may contain software for aiding in this conversion. A radio circuit 72 couples to the transmitter/receiver 74 which broadcasts frames at predetermined intervals across the wireless media.

In the preferred embodiment of the present invention, the transmission standard is the IEEE 802.11 Standard. When the data leaves the interface card 56, it is in the form of datagrams. These datagrams are then converted to IEEE 802.11 frames by the MAC layer chip 70 and flash RAM 76. Cyclical redundancy checking (CRC) may be utilized by the radio circuit 72 to ensure the accuracy of the transmission of data.

Figure 3:
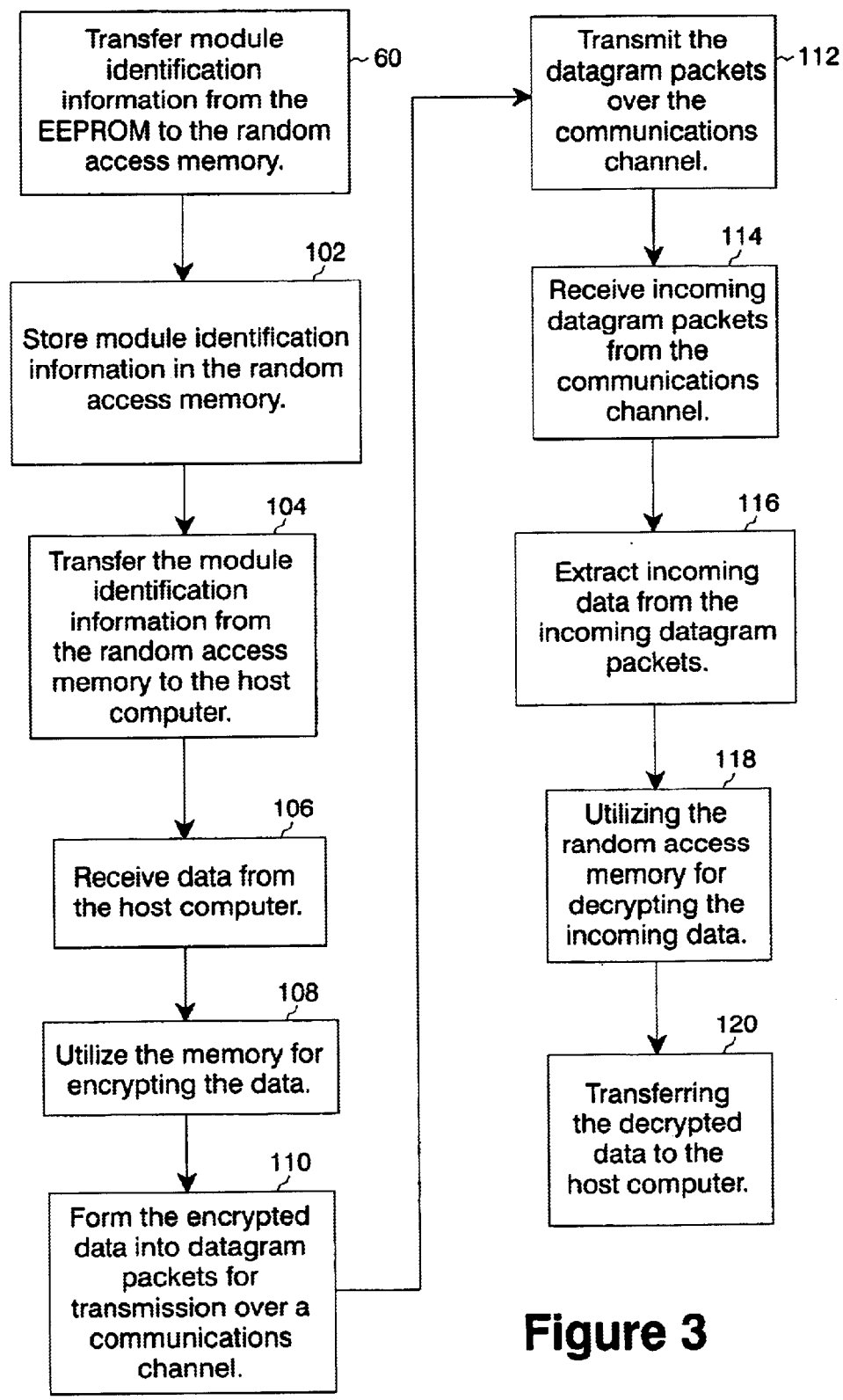
FIG. 3 is a flow diagram illustrating a method for utilizing the random access memory contained on an IC chip in accordance with a presently preferred embodiment of the present invention.

FIG. 3 is a flow diagram illustrating a method for utilizing a random access memory in an interface chip of a peripheral module in accordance with a presently preferred embodiment of the invention. At step 100, the module identification information is transferred the EEPROM to the random access memory. At 102, the module identification information is stored in the random access memory. At step 104, the module identification information is transferred from the random access memory to the host computer. At step 106, data is received from the host computer. At step 108, the random access memory is utilized for encrypting the data. At step 110, the encrypted datagrams are formed into datagrams for transfer to a MAC processor, and ultimately transmission over the communications channel. Then at step 112, the packets are transmitted over the communications channel.

If data is received over the communications channel, at step 114, the incoming packets are received from the communications channel. At step 116, incoming datagrams are extracted from the incoming packets. At step 118, the random access memory is utilized for decrypting the incoming datagrams. At step 120, the decrypted data is transferred to the host computer.

While the term "circuitry" is used throughout this document, it is recognized that portions of the present invention may just as easily be performed by software running on a processor or microcontroller, either as a discrete component or contained within an ASIC.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for utilizing a dual-function random access memory in an interface chip of a peripheral module for encrypting data, the peripheral module connectable to and for use with a host computer, said method comprising the steps of:

interfacing said interface chip with said host computer via a standard interface slot for transferring data to and from said host computer;

storing module identification information on a non-volatile memory component of said peripheral module;

transferring said module identification information from the non-volatile memory to the host computer said transferring step comprising the steps of copying said module identification information to said dual-function random access memory prior to transferring said module identification information to said host computer;

receiving data from the host computer;

utilizing said dual-function random access memory for subsequent encrypting of said received data into encrypted datagrams;

forming said encrypted datagrams into packets in accordance with a communications protocol for transmission over a communications channel;

transmitting said packets over said communications channel in accordance with said communications protocol;

receiving encrypted incoming datagrams from said communications channel; and storing said encrypted incoming datagrams in said dual-function random access memory.

2. The method of claim 1, wherein said storing and transferring steps are performed during power up of the host computer and/or initialization of said peripheral module and steps subsequent to the transferring step are performed thereafter.

3. The method of claim 1, wherein the peripheral module is a wireless network radio card and said communications channel is a EEEE 802.11 wireless network.

4. The method of claim 1, wherein the encryption process utilizes an RSA RC4 variable-key-size stream cipher.

5. The method of claim 4, wherein said dual-function random access memory is an SRAM containing 256 K bytes.

6. The method of claim 1, wherein the module identification information is formatted as a Card Information Structure (CIS) according to the PC Card Standard.

7. The method of claim 1, further including the steps of:

utilizing the dual-function random access memory for decrypting said encrypted incoming datagrams; and transferring said decrypted datagrams to the host computer.

8. The method of claim 1, wherein the peripheral module has a physical and electrical interface complying with the PC Card Standard of the PCMCIA.

9. The method of claim 1, wherein the communications channel is a wireless communications channel.

10. The method of claim 9, wherein the wireless communications channel is a IEEE 802.11 wireless network.

11. A program storage device readable by a machine, tangibly embodying a program of instructions executable by the machine to perform method steps for utilizing a random access memory in an interface chip of a peripheral module, the peripheral module connectable to and for use with a host computer, the method comprising the steps of:

interfacing said interface chip with said host computer via a standard interface slot for transferring data to and from said host computer;

providing a dual-function random access memory to said peripheral module;

storing module identification information on a non-volatile memory component of said peripheral module;

transferring said module identification information from the non-volatile memory to the host computer, said transferring step comprising the steps of copying said module identification information to said dual-function random access memory prior to transferring said module identification information to said host computer;

receiving data from the host computer;

utilizing said dual-function random access memory for subsequent encrypting of said received data into encrypted datagrams;

forming said encrypted datagrams into packets in accordance with a communications protocol for transmission over a communications channel; and transmitting said packets over said communications channel in accordance with said communications protocol.

12. An interface chip for use on a peripheral module, wherein the peripheral module is connectable to a standard interface slot of a host computer for transferring data to and from said host computer, the interface chip comprising:

a random access memory (RAM);

an encryptor/decryptor coupled to said RAM, which receives data from the host computer via said standard interface slot of said host computer and encrypts it in said RAM utilizing an encryption algorithm and a key, wherein the encrypted data is transmitted over a communications channel, and which further receives data from said communications channel and decrypts it in said RAM utilizing said encryption algorithm and said key, wherein the decrypted data is transferred to the host computer via said standard interface slot of said host computer; and an initializer coupled to said RAM which takes module information during a non-decrypt and a non-encrypt process from a memory external to said interface chip and said host computer and transfers said module information to said RAM, and transfers said module information to the host computer via said standard interface slot when required.

13. The interface chip of claim 12, wherein the communications channel is a wireless communications channel.

14. The method interface chip of claim 13, wherein the wireless communications channel is a IEEE 802.11 wireless network.

15. An encryption/decryption peripheral module comprising:

a coupling interface for electrically coupling said peripheral module to a standard interface slot of a host computer;

a communications assembly having a transmitter/receiver for wireless communications; and an interface chip comprising:

a random access memory (RAM);

an encryptor/decryptor coupled to said RAM, which receives data from the host computer and encrypts it in said RAM utilizing an encryption algorithm and a key, wherein the encrypted data is transmitted over a wireless communications channel by the communications assembly, and which further receives data from said wireless communications channel by the communications assembly and decrypts said data in said RAM utilizing said encryption algorithm and said key, wherein the decrypted data is transmitted to the host computer; and an initializer coupled to said RAM which takes module information during a non-decrypt and a non-encrypt process from a memory external to said interface chip and said host computer and transfers said module information to said RAM, and transfers said module information to the host computer when required.

16. The peripheral module of claim 15, wherein the wireless communications channel is a IEEE 802.11 wireless network.

17. The peripheral module of claim 15, wherein the interface chip is an ASIC.

18. A method for utilizing a dual-function random access memory in an interface chip of a peripheral module for decrypting data, the peripheral module connectable to and for use with a host computer, said method comprising the steps of:

interfacing said interface chip with said host computer via a standard interface slot for transmitting data to and from said host computer;

storing module identification information on a non-volatile memory component of said peripheral module;

transferring said module identification information from the non-volatile memory to the host computer said transferring step comprising the steps of copying said module identification information to said dual-function random access memory prior to transferring said module identification information to said host computer;

receiving data transmitted over a communications channel by said dual-function random access memory;

utilizing the dual-function random access memory for decrypting said received data into datagrams; and transferring said decrypted data to said host computer.

19. The method of claim 18, wherein the communications channel is a wireless communication channel.

20. The method of claim 19, wherein the wireless communications channel is a IEEE 802.11 wireless network.

* * * * *